United States Patent
Shastry et al.

(10) Patent No.: US 7,906,167 B2
(45) Date of Patent: Mar. 15, 2011

(54) WATER BASED INKS FOR PRINTING ON CONFECTIONERY

(75) Inventors: Arun V. Shastry, Neshanic Station, NJ (US); Pamela K. Gesford, Harleysville, PA (US); Diane C. Kunkle, Coopersburg, PA (US)

(73) Assignees: Mars Incorporated, McLean, VA (US); BPSI Holdings, Inc., Wilmington, DE (US)

( * ) Notice: Subject to any disclaimer, the term of this patent is extended or adjusted under 35 U.S.C. 154(b) by 0 days.

(21) Appl. No.: 10/795,107

(22) Filed: Mar. 5, 2004

(65) Prior Publication Data

US 2004/0175463 A1 Sep. 9, 2004

Related U.S. Application Data

(60) Provisional application No. 60/453,116, filed on Mar. 7, 2003.

(51) Int. Cl.
 *A23G 3/00* (2006.01)
(52) U.S. Cl. .......... 426/660; 426/103; 426/250; 426/540
(58) Field of Classification Search .................. 426/138, 426/250, 273, 302
 See application file for complete search history.

(56) References Cited

U.S. PATENT DOCUMENTS

| | | |
|---|---|---|
| 3,052,552 A | 9/1962 | Koerner et al. |
| 3,475,187 A | 10/1969 | Kane ................. 106/22 |
| 3,694,237 A | 9/1972 | Piotrowski |
| 4,168,662 A | 9/1979 | Fell |
| 4,390,369 A | 6/1983 | Merritt et al. |
| 4,670,271 A | 6/1987 | Pasternak |
| 4,835,208 A | 5/1989 | Ball |
| 5,006,362 A | 4/1991 | Hilborn |
| 5,397,387 A | 3/1995 | Deng et al. |
| 5,405,642 A | 4/1995 | Gilis et al. |
| 5,435,840 A | 7/1995 | Hilborn .................. 106/20 R |
| 5,453,121 A | 9/1995 | Nicholls et al. |
| 5,453,122 A | 9/1995 | Lyon |
| 5,466,287 A | 11/1995 | Lyon |
| 5,637,139 A | 6/1997 | Morelos et al. |
| 5,711,791 A | 1/1998 | Croker et al. |
| 5,800,600 A | 9/1998 | Lima-Marques et al. |
| 5,800,601 A | 9/1998 | Zou et al. |
| 2002/0114878 A1 | 8/2002 | Ben-Yoseph et al. |
| 2002/0152927 A1 | 10/2002 | Russell et al. ............. 106/31.13 |
| 2004/0021757 A1 | 2/2004 | Shastry et al. |
| 2004/0086603 A1 | 5/2004 | Shastry et al. |

FOREIGN PATENT DOCUMENTS

| | | |
|---|---|---|
| EP | 705890 A1 | 4/1996 |
| EP | 0911372 A1 | 4/1999 |
| GB | 2186782 | 8/1987 |
| JP | 54 006606 | 1/1979 |
| JP | 54 006606 A | 1/1979 |
| JP | H9-302294 | 11/1997 |
| KR | 2001-0055191 | 7/2001 |

OTHER PUBLICATIONS

Hendrix, Drew. Red River Paper: Ink Jet Printing 101: Chapter 1. Apogee Photo Magazine, May 19, 2000. http://www.apogeephoto.com/mar2000/inkjet101.shtml Date obtained from http://web.archive.org/web/*/http://www.apogeephoto.com/mar2000/inkjet101.shtml.*
Wikipedia, the free encyclopedia. "Anthocyanin". pp. 1-11. http://en.wikipedia.org/wiki/Anthocyanin Mar. 12, 2008.*
Eutech, Introduction to Conductivity, Feb. 14, 2009, http://www.eutechinst.com/techtips/tech-tips25.htm., pp. 1-3 Date obtained from http://www.webarchive.org, p. 1.*
Patent Abstracts of Japan, vol. 0186, No. 04 (Nov. 17, 1994).
Horiba Scientific, The Story of Conductivity, <<http://www.horiba.com/scientific/service-support/application-center/ph-meter-faq/the-story-of-conductivity>> (last viewed Apr. 19, 2010), pp. 1-6.
"Glycerol Ester of Wood Rosin", JECFA (1996), pp. 1-12.
Office Action dated Oct. 5, 2010 in Japanese Application No. 2006-606980 (English Translation).

* cited by examiner

*Primary Examiner* — Kelly Bekker
(74) *Attorney, Agent, or Firm* — Fitzpatrick, Cella, Harper & Scinto

(57) ABSTRACT

Non-pigmented, water-based inks are disclosed which are compatible with industrial piezojet printheads and which can be used to form high resolution images on edible substrates, including sugar shell confectionery polished with a hydrophobic wax polish. The ink comprises a hydrolyzable polysaccharide adhesive agent, such as tapioca dextrin or gum arabic, which enhances the compatibility of the ink for hydrophobic surfaces.

3 Claims, No Drawings

WATER BASED INKS FOR PRINTING ON CONFECTIONERY

This application claims the benefit of priority under 35 U.S.C. §119(e) of U.S. Provisional Application No. 60/453,116, filed Mar. 7, 2003, incorporated herein by reference.

BACKGROUND OF THE INVENTION

1. Field of the Invention

The invention is directed to water-based inks for ink-jet printing on edibles, to methods of ink-jet printing on edibles using the inks, and to edible products made by such methods. The inks and methods described herein may be employed for forming printed edible products as diverse as pharmaceutical pills and tablets to sausage casings. However, the invention has particular utility for printing on confectionery, including, without limitation, chocolate bars and tableted products, jelly beans, toffees and chewing gums, and particularly for printing high resolution and high definition images on non-planar, non-porous hydrophobic surfaces of polished sugar shell confectionery, such as the surfaces of M&M's® Milk Chocolate and Peanut Chocolate Candies.

2. Description of the Related Art

It is known to print identifying or decorative images on edibles. The present technology for printing on M&M's® Milk Chocolate and Peanut Chocolate Candies is by a contact printing process utilizing an offset roller, in what is referred to herein as rotogravure printing. The rotogravure system is limited in the number of colors that can be applied to a substrate. Traditionally, one color is printed, and with modifications two or three colors may be applied, but full color printing on edibles is not possible. The rotogravure roller is also limited in the surface area of a non planar piece that it can print. As with other contact methods of printing, there is a danger of the rotogravure roller crushing the edible articles being printed. Print designs cannot be changed or modified easily using the rotogravure method, because each new design must be engraved on a roller. If a non-contact printing method such as ink-jet printing could be used, there would be distinct advantages.

The ink systems used in rotogravure printing, generally comprise shellac, ethyl alcohol and pigments, to which may be added dyes, plasticizers, additional solvents and other ingredients to modify the characteristics of the ink. Such inks have a relatively high viscosity such that they sit on the non-porous surface until dry, and they are not ink-jettable. Thus, the inks conventionally utilized for printing on small pieces of confectionery or on pharmaceutical tablets and the like by the rotogravure method cannot be adapted to ink-jet processes.

Another popular method for printing on edibles, particularly on cakes and other large substrates, involves using an edible transfer sheet which can be handled in a printer and which are relatively porous and hydrophilic and therefore can readily accept an image from a water-based ink, including an ink-jetted image. Various methods are then used to transfer the image from the sheet to an edible substrate. An exemplary ink for use with this type of system is disclosed in U.S. Patent Application Publication US 2002/0008751 and comprises water, isopropyl alcohol, sodium lauryl sulphate and FD&C colorant. In the transfer sheet technology, printing is not performed directly on the surface of an edible conveyed past a printhead. Using a transfer sheet requires a component of the substrate to partly dissolve the sheet or to allow the sheet to adhere to the substrate. Thus, the transfer sheet technology is not readily adapted to the high speed production of images on non-planar surfaces of confectionery pieces. The water-based inks adapted for use with transfer sheets do not perform properly for ink-jet printing on non-planar, non-porous and hydrophobic surfaces, as they adhere poorly, dry too slowly and lack opacity.

Ink-jet printing on edibles, particularly on sugar shell confectionery pieces, if the technology could be perfected, would be attractive from many vantage points: it would eliminate the need to contact the edible substrate with a contact member such as a roller. Further, since ink-jet printing is a non-contact printing system, slight variations in the size of edibles would not negatively impact upon printing quality, as typically occurs with pad or roller based systems. Also, an ink-jet printer image is stored as data, and not fixed on a contact member. Thus, if an ink-jet printer could be effectively used, images could be selected, altered, transmitted, and the like, more easily than in contact printing, permitting faster changeover of designs. Use of ink-jet technology would also permit full color printing using multicolor printheads.

Ink-jet printing systems are broadly divided into continuous jet, and drop-on-demand (also called "impulse") systems in which droplets are generated as needed for ejection to the substrate surface for image formation. Methods of ink-jet printing on edible substrates using continuous jet technology have been disclosed. Most of these are directed to labelling and similar applications which do not require high resolution.

In continuous jet systems, ink is emitted in a continuous stream under pressure through at least one nozzle. The stream is broken up into droplets at a fixed distance from the orifice, typically by a piezoelectric crystal, which is vibrated at controlled frequency adjacent to the ink stream. The function of the piezoelectric crystal is different in a continuous jet system than in a piezojet drop-on-demand system. In a continuous jet system, the ink stream is generated under pressure in the reservoir, and the crystal serves simply to break up the droplets. To control the flow of ink droplets, the inks are electrostatically charged (by addition of salts and other conductive agents) and the droplets are passed through an electrostatic field, which adjusts the trajectory of the droplets, in accordance with digital data signals. The conductance requirements for continuous jet inks therefore range from 700 to 2000 micro Siemens, which generally requires that the ink contains a conductivity enhancing salt. The droplets are either directed back to a gutter for recirculation or to a specific location on the substrate to create the desired character matrix. A typical resolution for a continuous jet printer image in an industrial setting, using a single printhead and a single pass printing is about 75-100 dots per inch (dpi).

Most of the inks developed for continuous jet systems are based on the solvent methyl ethyl ketone (MEK) and are therefore not suitable for use in an edible ink. The inks that have been developed for continuous jet printing on edibles, or on surfaces which may contact edibles, have been pigmented, or based on solvents associated with other drawbacks.

U.S. Pat. No. 5,453,122, for example, discloses an ink which it is said can be applied directly to a foodstuff, or to packaging closely associated with a foodstuff, and which avoids the use of methyl ethyl ketone. The ink is also said to be suitable for use in a piezojet printhead. However the ink relies on the presence of substantial amounts of acetone solvent. If such an ink is less toxic than an MEK-based ink, the substantial amounts of acetone in such an ink limit its use for printing on edibles. Inks having substantial amounts of acetone are less desirable to work with in this area.

U.S. Pat. No. 5,800,601 discloses pigment-based inks said to be suitable for printing on edibles, including glazed candies, using a continuous jet system. Specifically, the disclosure is directed to modification of pigment particle surface characteristics to improve the drying time and adhesion of the inks. These inks are also characterized by the presence of conductivity enhancing salts.

U.S. Pat. No. 5,637,139 discloses non-aqueous inks, also for continuous jet systems, and focused on applications for labelling fruit and the like substrates with citrus #2 dye.

Continuous jet inks also have a very narrow range of acceptable viscosity. Inks having a viscosity above about 10 centipoise (cp) at low shear rates cause the pumps in the printhead to cavitate during use. Below a viscosity of about 2 to about 3 cp, the jets are not stable. Thus most, if not all, continuous jet ink jet inks have a viscosity of about 2.8 to about 6 cp.

Commercially available continuous jet inks have not been developed for printing on hydrophobic edible substrates. The presence of conductivity enhancing salts required in these inks would also be likely to affect taste.

Of the drop-on-demand systems, the most economically important today are piezojet and bubblejet (sometimes referred to as thermal ink-jet) systems. In bubblejet systems, a bubble is formed by a resistance heater in an ink reservoir. The resulting pressure wave from the bubble forces ink through the orifice plate, and as the heat is removed, the bubble begins to collapse and a droplet is ejected. Bubblejet printheads dominate the home and office ink-jet printer markets and they are capable of very high resolution. However, several considerations limit their use for printing on edibles in an industrial setting.

This viscosity of bubblejet inks is very low, on the order of 1.5 cp, necessary so that a bubble can form quickly upon application of minimal voltage to the resistance heater. The known bubblejet printers cannot readily handle the presence of binders or polymeric additives. Moreover, the ink must be capable of withstanding the temperature cycling encountered inside the printhead. For these reasons, the number of inks which could be developed for printing on edibles with a bubblejet printer is extremely limited. The thermal jet printheads are also associated with ink drying on the surface of the jet channels. It would be preferable if piezojet systems could be developed for printing on edibles, as piezojet printheads do not require large temperature oscillations. Bubblejet printers are also much too slow to permit high speed printing directly on edible substrates. Thermal jet printheads (or bubble jet printheads, as they are also known) are used for transfer sheet applications, because the transfer sheets are porous and hydrophilic enough to be used with the known inks.

Water-based edible inks known to be thermal jet compatible are disclosed in co-pending U.S. application Ser. No. 10/211,592. However, it has been demonstrated that these inks are incompatible with hydrophobic surfaces.

A method of ink-jet printing on edibles is described in co-pending U.S. patent application Ser. No. 09/587,108. The ink described therein is a pigmented white ink which has found utility for printing on chocolate.

Pigmented ink compositions, including non-white colored pigmented inks, have been disclosed in the prior art, including the aforesaid U.S. Pat. No. 5,800,601. However, pigmented inks are less preferred for drop-on-demand ink-jet systems, because the pigments can influence the rheology of the ink causing poor jettability. Also, the presence of pigment particles may require additional maintenance of the printhead. Once printed, the pigment particles tend to sit on the substrate surface, flaking off easily, or requiring the use of additional binders and/or resulting in poor image adhesion.

Piezojet printheads are characterized by a piezoelectric device which causes ejection of ink from a reservoir, such as by a piezoelectric crystal deforming the wall of the reservoir in accordance with data signals. Heretofore, edible inks have not been developed for these systems. Piezojet printheads have larger channels than bubblejet printheads which affords a greater range of acceptable ink ingredients.

The food colorants approved for human consumption by the United States Food and Drug Administration, and natural colorants which generally do not require such approval, are water soluble, and consequently food grade inks made from such colorants are water-based. These water-based colorants tend to be poorly compatible with hydrophobic surfaces of M&M's® Milk Chocolate and Peanut Chocolate Candies, which are finished with carnauba wax.

In summary, the rotogravure technology is not capable of printing in full color on edibles and prohibits rapid changeover of print designs, while continuous jet printing is not capable of achieving high resolution. It would be desirable to print on edibles with piezojet ink-jet systems to achieve these objectives. However, water-based, non-pigmented inks suitable for piezojet printheads, particularly inks having compatibility with hydrophobic or waxy surfaces, have not heretofore been available. There is also a need to print higher resolution, full color images on confectionery, which rotogravure techniques are not capable of delivering. Rotogravure techniques, because they rely on contacting the substrate, can only print on a limited surface area of the substrate. The contact printing systems, including rotogravure, cannot accommodate irregularities in the size and shape of an edible printing substrate, such are found, for example, on M&M's® Milk Chocolate and Peanut Chocolate Candies.

Thus, there continues to be a need in the industry for edible ink-jet compatible inks, particularly piezojet compatible inks, which can be used to print high resolution images directly on edible substrates, particularly those edible substrates that are difficult to print on using conventional technology, such as those having a sugar shell surface with a wax or fat polish coating.

SUMMARY OF THE INVENTION

In one aspect the invention is a pigment-free water-based ink-jettable edible ink, which can form a high resolution image on a hydrophobic edible substrate. The ink comprises water, an edible colorant, and a hydrolyzable polysaccharide adhesive agent which enhances the compatibility of the ink for a hydrophobic surface.

In another aspect, the invention is a method for ink-jet printing images on confectionery pieces in which confectionery pieces having a hydrophobic surface are positioned proximate a print station comprising a piezojet ink-jet printhead with at least one ink reservoir containing an edible, water-based ink, substantially free of conductivity enhancing salts, with a hydrolyzable polysaccharide adhesive agent to enhance adhesion of the ink to the hydrophobic surface. A high resolution image composed of individual dried ink droplets is printed on the confectionery by ejecting the ink from the piezojet ink-jet printhead to the hydrophobic surface in accordance with image data provided to the printhead.

In yet another aspect, the invention is the piece of confectionery itself, having a hydrophobic surface (such as a sugar shell polished with wax) with an image comprised of individual dried ink droplets printed in a non-pigmented water-based ink having an edible colorant and a hydrolyzable polysaccharide adhesive agent to enhance the compatibility of the ink for the surface. The image has a dpi resolution preferably greater than about 100 dpi resolution and most preferably greater than about 300 dpi resolution.

In yet another aspect, the invention is an edible ink comprising a colorant, an aqueous carrier for the colorant and an image setting system. The image setting system is selected to optimize the physical properties of the ink for piezojet ink-jet printing on edible substrates, particularly hydrophobic substrates, such that the ink sets properly and quickly on the surface. The inks therefore have a viscosity in a range of about 5 centipoise to about 20 centipoise and a surface tension below about 50 dynes/cm. In the most preferred embodiments, the inks include an image setting system containing an organic solvent, an adhesive agent and a binder, each selected such that the inks have a viscosity in a range of about 7 to about 15 centipoise and surface tension in a range of about 30-45 dynes/cm.

DETAILED DESCRIPTION OF THE PREFERRED EMBODIMENTS

The present invention is concerned with the industrial adaptation of piezojet drop-on-demand systems, which heretofore have not been used for printing high resolution images on edible substrates. The characteristics of the printheads determine which edible ingredients may or may not be used. Although the designs of the printheads differ, they are all characterized by a piezoelectric device which causes ejection of ink from a reservoir, such as by a piezoelectric crystal deforming the wall of the reservoir in accordance with data signals. The preferred piezojet printhead for use with the invention is manufactured by Xaar Technology Limited, located in Cambridge, United Kingdom. The piezojet systems are readily distinguishable to those of ordinary skill in the art from continuous jet or bubble jet systems. Thus, "inkjettable," as used herein, means an ink which can be ejected reliably from a piezojet printhead, without requiring excessive modification of the printhead or maintenance issues.

"Substantially free of conductivity enhancing salts" means that salts are not added specifically to increase the conductivity of the ink composition to a level, which the ink composition would not have in the absence of such salts, such that droplets of the ink can have their trajectory controlled in the electrostatic field of a continuous jet printer. In addition to not being required in a drop-on-demand system, these salts can have deleterious effects on the printhead components, such as corrosion. In preferred embodiments, the inks according to the invention have a conductivity below about 1500 micro Siemens, preferably lower than about 700 micro Siemens. An ink that is substantially free of conductivity enhancing salts may referred to as a "non-conductive" ink.

The ink systems according to the invention contain ingredients that make them compatible with the inkjet printhead, so that the inks will not damage the printhead components or cause inconsistent firing of jets. The ink must also be compatible with the surface of the edible substrate, providing a high resolution image which does not rub off easily once it has been cured on the surface. "Cured" in this context means that solvents have been evaporated, and the image is well-adhered, hardened and dried on the substrate.

Inks used in accordance with the present invention are edible as used and preferably meet regulatory standards for use in foods. This is of paramount importance in the area of printing on confectionery. Whereas pharmaceutical tablets must meet certain safety requirements, the fact that confectionery products are often eaten in larger quantities than pharmaceuticals imposes additional constraints on the ingredients that may be used in the inks.

All of the inks described herein are water-based. As used herein "aqueous" is synonymous with "water-based" and refers to a composition having greater than 50.0 percent by weight water. The water-based inks generally contain water in a range of about 50.0 percent by weight to about 85.0 percent by weight. Preferably deionized water is used. In the preferred embodiments, the inks contain 50.0 percent by weight to 80.0 percent by weight water, more preferably 50 percent by weight to about 75.0 percent by weight water, and most preferably 55.0 percent by weight to about 75.0 percent by weight of the ink is water.

The carrier ordinarily contains at least one lower ($C_1$-$C_6$) alcohol, propylene glycol or other organic solvent in an amount effective to reduce or control the drying time of the ink. As the surface tension of water is high (about 72 dynes per centimeter), it is necessary to add a component to the image setting system of the water-based inks to lower the surface tension to below about 50 dynes/cm and preferably to a range of about 25 to about 45 dynes/cm to permit efficient printing on an edible substrate with a piezojet printhead. The surface tension of the ink is important from the vantage point of compatibility with the edible substrate surface, and for droplet formation in the printhead.

A convenient measure of the compatibility of an ink with a non-porous substrate is the contact angle that the droplets make with the substrate surface. The ingredients of the ink are selected so that the contact angle is less than 50 degrees, in a range of about 10 degrees to about 50 degrees, preferably in a range of about 20 degrees to about 45 degrees, and more preferably in a range of about 30 to about 40 degrees. Of course, this consideration is relevant primarily to relatively non-porous surfaces.

The lower alcohol, propylene glycol or other organic solvent is present in a range of about 7.0 percent by weight to about 35.0 percent by weight, preferably about 7.0 percent by weight to about 30.0 percent by weight and most preferably in a range from about 10.0 percent by weight to about 30.0 percent by weight. "Organic solvents" includes all known solvents mostly miscible with the water and the other ingredients of the ink. However in connection with the water-based inks according to the invention, the preferred organic solvent consists of ethyl alcohol, isopropyl alcohol, butyl alcohol, propylene glycol or a mixture of them. Most preferably about 10.0 to about 20.0 percent by weight of the ink is ethanol, isopropyl alcohol, butanol, propylene glycol or a mixture of them.

As used herein, "solvent-based" means a composition containing more than about 35 percent by weight organic solvents. Generally, the ink compositions according to the invention are free of solvents such as acetates, lactates or volatile organic solvents containing benzyl groups. In preferred embodiments, the compositions may be substantially free of glycerol and solvent esters, e.g. acetates.

Suitable edible colorants include: the food dyes approved for human consumption under the Food, Drug and Cosmetic Act administered by the U.S. Food and Drug Administration (FDA), referred to herein as "FD&C dyes"; natural colorants derived from natural (usually vegetable) sources which are generally assumed to be safe for human consumption; colorants derived from natural sources which are FDA-approved; and synthetic colorants approved for use in non-U.S. jurisdictions. All of the edible colorants which can be used with the invention must be soluble in water or water-alcohol mixtures.

FD&C dyes that may be used include Red No. 3 (Erythrosine), Red No. 40 (Allura Red), Yellow No. 6 (Sunset Yel. FCF), Yellow No. 5 (Tartrazine), Green No. 3 (Fast Green FCF), Blue No. 1 (Brilliant Blue FCF), Blue No. 2 (Indigotine), and mixtures thereof. Natural colorants which may be used include: anthocyanins, betalins, carotenoids, and the like and mixtures thereof. Any of the foregoing colorants may be used in ink formulations according to the invention provided that the formulation as a whole is compatible with the printhead and provides sufficient adhesion to the surface of the edible substrate. In the most preferred embodiments, the foregoing colorants are completely solvated in the ink formulation such that there are substantially no colorant solids in the ink. The substantial absence of colorant solids in this context means less than about 5.0 percent by weight solids, preferably less than about 1.0 percent by weight solids. Even more preferably, the ink contain less than 0.1 percent by weight solids.

Edible colorant is present in the ink in an amount of about 0.5 percent by weight to about 15.0 percent by weight. Preferably, the ink contains about 0.5 percent by weight to about 10.0 percent by weight edible colorant; more preferably about 0.5 percent by weight to about 8.0 percent by weight; and most preferably about 0.5 percent by weight to about 6.0 percent by weight. The optimal amount of colorant in the ink appears to range from about 0.5 percent by weight to about 4.0 percent by weight. It has been found that, within the above ranges, some edible colorants (such as blue) require somewhat lower concentration to supply the same level of color saturation as it appears on the surface of the product, while other edible colorants (such as yellow) require somewhat more.

The ink composition also contains a hydrolyzable polysaccharide adhesive agent. Preferably the polysaccharide adhesive agent is present in the ink in a range of about 0.1 percent by weight to about 15.0 percent by weight, preferably in a range of about 0.5 percent by weight to about 12.0 percent by weight, more preferably in a range of about 1.0 percent by weight to about 10.0 percent by weight, and most preferably in a range of about 1.5 percent by weight to about 8.0 percent by weight of the ink composition. The optimal range for the hydrolyzable polysaccharide adhesive agent appears to be about 2.0 percent by weight to about 6.0 percent by weight of the ink composition.

The hydrolyzable polysaccharide preferably is a dextrin, cyclodextrin, or a gum, a carageenan, an alginate or calcium alginate, or a combination of such polysaccharides. The most preferred dextrin is tapioca dextrin. The most preferred gum is gum arabic.

It is also possible to substitute other adhesive agents, which when cured undergo crosslinking to enhance adhesion of the image to the edible substrate. In this context, proteinaceous materials, including gelatin, or cellulosic materials and/or hydrolyzed starch may be used.

Ink formulations according to the invention preferably contain a binder. A "binder" is understood to refer to an ingredient which forms a film between the components of the ink after all the solvent is removed and the image cured on the substrate. Thus, a binder can be easily distinguished both in terms of function and composition from the adhesive agent which is added to improve the compatibility of the ink for a particular surface. Known binders include shellac (which is usually combined with ammonia to raise the pH to about 9 to solubilize the shellac in water). Shellac may be diluted with water, or with ethyl alcohol or a like solvent. A shellac-based film former is available under the trade name Mantrolac® from Mantrose-Haeuer Co., Inc., Westport, Conn. As used herein, "shellac" is used interchangeably with "shellac-based film former" and percentages by weight refer to the percentage by weight of a shellac-based film former.

Polyvinylpyrrolidone (also referred to as polyvinylpyrrolidinone, povidone or PVP) may also be used in the edible binder system. The preferred binder for use in the water-based, non-pigmented inks according to the invention is a combination of polyvinylpyrrolidone and shellac, which has been shown to have unexpectedly improved impact on drying time and image quality over compositions which do not contain this combination.

The composition contains a binder in a range of about 2.0 percent by weight to about 40.0 percent by weight. A shellac-based film former may be present in an amount of about 2.0 percent by weight to about 40.0 percent by weight of the ink. Preferably, shellac is present in a range of about 4.0 percent by weight to about 35.0 percent by weight, more preferably in a range of about 5.0 percent by weight to about 30.0 percent by weight and most preferably in a range of about 8.0 to about 25.0 percent by weight with respect to the ink composition. The optimal amount of shellac is believed to be in a range of about 10.0 to about 20.0 percent by weight of the ink composition.

Polyvinylpyrrolidone may be present in an amount of about 0.01 percent by weight to about 20.0 percent by weight of the ink. Preferably, polyvinylpyrrolidone is present in a range of about 0.5 percent by weight to about 18.0 percent by weight, more preferably in a range of about 1.0 percent by weight to about 15.0 percent by weight and most preferably in a range of about 1.5 to about 12.0 percent by weight with respect to the ink composition. The optimal amount of polyvinylpyrrolidone is believed to be in a range of about 1.5 to about 10.0 percent of the ink composition.

The organic solvent (which is preferably a lower alcohol), the adhesive agent (which is preferably starch, a dextrin or a gum), and the binder system (which is most preferably a combination of shellac and polyvinylpyrrolidone) may be considered together as an "image setting system." These are the ingredients added to the aqueous carrier and the colorant to reduce drying time and surface tension of the ink, and to enhance compatibility of the ink with the edible substrate such that a durable adherent image is formed upon curing.

Other functional ingredients may be added to the composition to improve the performance of the ink. For example, a preservative/antimicrobial such as Polysorbate 80 may be added, preferably in an amount less than about 1 percent by weight. Antifoam agents, such as simethicone emulsion may be added, again preferably in an amount less than about 1 percent by weight.

Preservatives, flavorants, aromatics, micro-nutrients and vitamins may all be added in customary amounts to improve the attributes of the finished confectionery.

The foregoing ingredients are preferably selected such that the viscosity is in a range of about 5 centipoise to about 20 centipoise, more preferably in a range of about 7 to about 15 centipoise, measured at a shear rate of 200 $s^{-1}$ and 20° C. If the viscosity of the ink is much below 5 centipoise, satellite ink droplets tend to form around the main droplet forming the ink-jetted image, resulting in decreased image resolution. If the viscosity is too high, it becomes difficult to achieve sufficient pressure in the reservoir using a piezoelectric crystal. As a general rule, and as known in the art outside the field of printing with edible inks, ingredients should be selected to avoid the presence of dissolved gases in the ink, which can cause cavitation in the printhead.

Ink Composition Examples

The following compositions contain tapioca dextrin:

TABLE 1

|  | 1 | 2 | 3 | 4 | 5 | 6 |
|---|---|---|---|---|---|---|
| Water | 65-67 | 73.40 | 68.40 | 68.34 | 73.4 | 60.40 |
| Organic Solvent*** | 13.2 | 12.00 | 17.00 | 17.07 | 12.00 | 25.00 |
| Colorant | 1.9-2.5 | 3.98 | 4.0 | 4.0 | 4.0 | 4.0 |
| Shellac | 10 (Aq.) | — | — | — | — | — |
| Povidone | 5.00 | 5.00 | 5.00 | 5.00 | 5.00 | 5.00 |
| Ammonia (Aq.) | 0.5 | — | — | — | — | — |
| Dextrin | 2.5 | 5.0 | 5.0 | 5.0 | 5.0 | 5.0 |
| Additives** | 0.60 | 0.60 | 0.60 | 0.60 | 0.60 | 0.60 |

**Antifoam agent and preservative
***Combinations of propylene glycol, isopropyl alcohol and butanol Ink Composition Comparative Examples The following compositions contain a shellac/povidone binder system, without the hydrolyzable polysaccharide adhesive agent.

TABLE 2

|  | 7 | 8 | 9 | 10 | 11 | 12 |
|---|---|---|---|---|---|---|
| Water | 70.60 | 52.90 | 52.90 | 67.90 | 56.60 | 67-68 |
| Organic Solvent*** | 11.94 | 17.00 | 17.00 | 12.00 | 25.00 | 13.2 |
| Colorant | 3.96 | 4.00 | 4.00 | 4.00 | 2.50 | 2-3 |
| Shellac | 9.95 | 20.00 | 10 (Aq.) 10 (EtOH) | 10.00 | 10.00 | 10 (Aq.) |
| Povidone | 2.50 | 5.00 | 5.00 | 5.00 | 5.00 | 5.00 |
| Ammonia (Aq.) | 0.50 | 0.50 | 0.50 | 0.50 | 0.30 | 0.5 |
| Dextrin | — | — | — | — | — | — |
| Additives** | 0.60 | 0.60 | 0.60 | 0.60 | 0.60 | 0.60 |

**Antifoam agent and preservatives
***Combinations of propylene glycol, isopropyl alcohol and butanol A composition according to Example 1 is prepared except that the dextrin is replaced with 2.5 grams of gum arabic, yielding another embodiment in accordance with the invention. A composition having the composition of Example 2 is prepared, except that 5.0 grams carageenan is substituted for the dextrin. The resulting ink is within the scope of the invention. A composition according to Example 12 is prepared, and 5.0 grams of a cyclodextrin is added to produce another composition within the scope of the invention.

Ink and Ink Image Properties

An important parameter useful in characterizing the ink systems for printing on edibles is the intrinsic viscosity, defined as the limiting value of the ratio of specific viscosity to concentration at infinite dilution.

$$[\eta] = \lim_{c \to 0}(\eta_i / c) = \lim_{c \to 0} \eta_{inh}$$

wherein $[\eta]$ is the intrinsic viscosity, $[\eta_i]$ is the specific viscosity (also equal to $\eta_r - 1$, where $\eta_r$ = solution viscosity/solvent viscosity), c is concentration, and $\eta_{inh}$ is the inherent viscosity (also equal to $\ln \eta_r / c$).

Intrinsic viscosity is usually used to characterize the viscous effect of a polymer in a particular solvent. In the context of the present invention, the binder and adhesive agent are considered the "polymer" and the remainder of the ingredients in the inks is considered the "solvent" to determine the intrinsic viscosity. Intrinsic viscosity has units of inverse concentration. It has surprisingly been found that intrinsic viscosity correlates with the compatibility of an ink for a given edible substrate surface. Higher intrinsic viscosities correlate with better adhesion.

To obtain an intrinsic viscosity for the binders/adhesive agents in the ink, a Canon-Fenske (Ostwaald-type) viscometer was used. The viscometer was calibrated with deionized water at 20° C., which has a known viscosity. The viscometer was then filled with the ink to be tested and the viscosity measured. The ink was diluted by 50 percent by volume with deionized water and the viscosity measured again. The process was repeated at successive dilutions and the resulting plot extrapolated to zero concentration.

Table 3 shows the intrinsic viscosity of an exemplary ink according to the invention and a Comparative Example, measured at 20° C. in a Canon-Fenske viscometer. Preferred inks according to the invention have an intrinsic viscosity in a range of about 23 to about 30 cc/gram.

TABLE 3

|  | Comparative Example 12 | Example 1 |
|---|---|---|
| intrinsic viscosity | 21.4 | 23.6 |

Compatibility with a surface may be determined by a variety of methods. For example, when the surface of the edible substrate is non-porous and hydrophobic, a smaller contact angle made by the ink droplet on the surface is consistent with better compatibility and adhesion of the ink for the substrate, as well as with reduced drying time.

Contact angle measurements were made of ink droplets according to the invention on a surface of a confectionary piece having a carnauba wax polish coating similar to a surface found on M&M'S® Milk Chocolate Candies. A comparison of the contact angle (left and right side of the droplet) with a similar measurement made for a droplet of ionized water shows the substantial reduction in contact angle brought about by the image setting system.

TABLE 4

| (CONTACT ANGLE) | | | |
|---|---|---|---|
| Example 6 | | Deionized water | |
| Left | Right | Left | Right |
| 32 | 38 | 74 | 72 |
| 40 | 34 | 72 | 68 |
| 38 | 34 | 76 | 74 |
| 34 | 37 | 74 | 66 |

In preferred embodiments, methods according to the invention involve printing of multicolor images utilizing multicolor printheads. In preferred embodiments, a standard ink jet printhead is modified by installing a white ink reservoir and print engine where the black ink reservoir and print engine are found in a standard printhead configuration and providing a white pigmented ink to that reservoir. The remaining print engines may be provided with water-based inks in the customary colors (cyan, magenta, and yellow), in the ordinary configuration. The standard KCMY arrangement can be used, where the letters KCMY are understood to refer to white, cyan, magenta and yellow print engines, arranged in that order in the direction of print travel. It is contemplated that printheads with more than 4 colors could be used. It is also known to print without a white print engine, using a separate black print engine or a combination of cyan, magenta and yellow to make black. Any of the foregoing configurations could be used without departing from the scope of the invention.

It is contemplated that almost any edible surface can be printed using these inks. These foods include, without limitation, baked goods, biscuits and cakes, cookies, nuts, chocolates, cheeses, crackers and chips, and pastries, puddings and mousses, ice creams and creams, pet food and pet treats, main meal snacks, cereals, sausage casings, and pharmaceutical tablets, pills, capsules, caplets and dragees. In particularly preferred embodiments, images are printed onto sugar shelled confections having a hydrophobic wax coating, such as M&M's® Peanut and Milk Chocolate Candies. A particularly preferred edible surface for use with the inks of the present invention is a hydrophobic and/or non-porous edible surface. As used herein, the term hydrophobic surface means a surface that is antagonistic to water and does not appreciably dissolve in water. Such surfaces will typically be comprised of oils, fats or waxes and are readily recognized by those of ordinary skill in the art. As used herein, the term "non-porous surface" means a surface that is not substantially permeable to water. Such non-porous surfaces will also be readily apparent to those of ordinary skill in the art. An exemplary, but clearly non-limiting example of a non-porous hydrophobic surface is a carnauba wax surface.

Resolution for an ink-jet printer may be defined by the density of pixels making up an image. Continuous jet systems are typically capable of achieving resolution of about 75 to about 100 dpi. In the context of the present invention, less than about 100 dpi is considered low resolution and greater than about 100 dpi is defined as high resolution. Among the printheads capable of producing high resolution images, low end piezojet systems are typically capable of resolution in the range of about 100 dpi to about 150 dpi, which is defined herein as moderately high resolution. More advanced piezojet systems, such as those available from Xaar Technology Limited (Cambridge, United Kingdom) or Spectra, Incorporated, (Lebanon, N.H. U.S.A.) are capable of printing at 150 dpi to 300 dpi, herein defined as very high resolution which affords very good line art images, clip art images, cartoon-type images as well as text and schematic images. By optimizing printing techniques, resolution of 300 dpi to 800 dpi can be achieved, which may be termed near-photographic or photographic high resolution. Bubblejet ink-jet technology, predominantly found in the home and office printer markets, can produce images up to 1600 dpi in some cases. However, the bubblejet printheads are slow, have very small channels and require extremely low viscosity inks, which makes them unsuitable for commercial printing on edibles with a wide range of inks. The ingredients needed to improve image adhesion with a hydrophobic surface would likely create fouling issues if used with a thermal jet system due to the high temperatures encountered in those printheads. An advantage of the methods according to the present invention is that they make possible confectionery products bearing images having a resolution greater than about 100 dpi, preferably greater than about 150 dpi and even more preferably greater than about 300 dpi, using a wide variety of inks. Using the technology described herein, the inventors have formed ink-jet photographic likeness of individuals on M&M's® Milk Chocolate and Peanut Chocolate Candies.

Techniques are known in the art for increasing the dots-per-inch resolution of an ink-jet printed image. These include what is known as "stitching" or "interlacing" the printheads. Another technique involves positioning the printheads at an angle with respect to the traveling direction of the substrate. Both of these methods result in more droplets impinging on a given printing area. While these techniques can be used with the present invention, it is the performance of the inks on the substrates in question that permits the techniques to be used in the first place. Performance of the ink includes the ability of each droplet to maintain its integrity and not to mingle with other droplets before drying. Thus, it must be emphasized that resolution is not simply a function of the equipment used, but of the performance of the ink on a given edible substrate.

Another measure of image quality is referred to herein as adhesion. To determine the image adhesion, an aluminum block was designed with a cavity to hold a confectionery piece. The piece was a white M&M's® Milk Chocolate Candies piece, having a sugar shell with a carnauba wax coating. The piece was placed with the image facing upwards. An 8.5" (21.6 cm) long paper piece was placed on top of the candy piece such that the paper sat directly on top of the printed image. The paper used was Xerox® brand 4024 type copier paper. Another block with a groove to follow the curvature of the candy piece was placed on top of the candy piece, and aligned with the bottom block by two pins. A weight of 1 lb (454 g) was placed on top of the upper metal block, and the paper piece was pulled across the "image" portion of the candy piece. The length of the paper that was moved across the candy piece was 7.5" (19.05 cm) under the 1 lb (454 g) weight.

The image was a large "m" printed with red ink, 1 cm wide by 0.6 cm high with a line thickness of 0.15 cm. In each case, the image was analyzed for overall brightness using a Minolta CM-3500d spectrophotometer. The medium aperture sample holder was used for the analysis. As the candy pieces were all white, a higher brightness value means that the some of the image was lost during the abrasion of the paper under the weight. A brightness measure "L" was made before and after the test described above. A high difference in brightness before and after the test ("ΔL") corresponds to poor image adhesion.

The following results were observed for Examples 1 and 6 and Comparative Example 10:

TABLE 5

| Example | ΔL | Std. Deviation |
| --- | --- | --- |
| 1 | 1.2 | 1.2 |
| 6 | 1.6 | 1.4 |
| 10 (Comparative) | 4.2 | 0.4 |

At least qualitatively, the presence of dextrin is observed to result in an increase in adhesion, and the combination of povidone, shellac and dextrin yields still better adhesion results. It is preferred to use inks resulting in an image adhesion value ("ΔL") less than 4, more preferably less than 3, and most preferably less than 2.

In printing baked goods, such as cookies, the edible substrates are conveyed in any manner conventionally practiced in the art, such as a belt conveyor. The edible substrates are conveyed past a stationery piezoelectric printhead, such as a type commercially available from Xaar Technology Limited, Cambridge, United Kingdom. Water based inks according to the invention, as described above are provided to the printhead. The standard configuration provides for reservoirs of cyan, magenta and yellow ink. A fourth reservoir (conventionally provided with black ink), may be provided with an edible black ink, or more preferably with an edible white pigmented ink. Ink is ejected from the printhead in accordance with image data and the ejected droplets cure on the surface to form dried ink droplets on the substrate in an image having a resolution of greater than 100 dpi.

In printing relatively small confectionery pieces such as M&M's® Milk Chocolate and Peanut Chocolate Candies, it is preferable to convey the pieces on a conveyor and hold them in place as they pass a stationery printhead, which may have the same configuration described above. Generally a pocket shaped to hold the piece is sufficient to hold the pieces in place, although if necessary, a trapping mechanism or vacuum may be utilized to keep the pieces immobile during the printing process to ensure the best resolution. The conveyor may be a drum with pockets or an endless belt with carrier bars. Methods and apparatus for conveying small edible pieces are described in co-pending application Ser. No. 09/479,549. Other approaches are also possible, for example transporting the pieces directly on a belt.

While the present invention has been described with respect to what are presently considered to be the preferred embodiments, the invention is not to be limited to the disclosed embodiments. Rather, the present invention encompasses various modifications and equivalents included within the spirit and scope of the appended claims. The scope of the appended claims is to be accorded the broadest interpretation so as to encompass all such modifications and equivalent materials and functions.

What is claimed is:

1. A confectionery piece comprising:
   an image comprised of individual dried ink droplets having a resolution greater than 150 dots per inch printed with a piezojet drop-on-demand printer on a hydrophobic surface thereof with a non-pigmented water-based edible ink comprising:
   50.0 percent by weight to 85.0 percent by weight water;
   7.0 percent by weight to 35.0 percent by weight ethanol, isopropyl alcohol, butanol, propylene glycol or a mixture thereof;
   0.5 percent by weight to 15.0 percent by weight of a non-pigmented edible colorant selected from the group consisting of FD&C dyes, non-pigmented natural colorants, and non-pigmented synthetic colorants, wherein the colorant is soluble in water or water-alcohol mixtures;
   2.0 percent by weight to 40.0 percent by weight binder; and
   1.5 percent by weight to 8.0 percent by weight of a dextrin or gum adhesive agent;
   wherein the ink is substantially free of conductivity enhancing salts and has a conductivity lower than 700 micro Siemens.

2. The confectionery piece according to claim 1, wherein the hydrophobic surface is a non-planar sugar shell surface having a hydrophobic fat-based or wax-based polish coating thereon.

3. The confectionery piece according to claim 1, wherein said binder comprises, with respect to the edible ink, 8.0 percent by weight to 25.0 percent by weight shellac-based film former, and 1.5 percent by weight to 12.0 percent by weight polyvinylpyrrolidone.

* * * * *